(12) United States Patent
Luebben et al.

(10) Patent No.: US 6,755,606 B2
(45) Date of Patent: Jun. 29, 2004

(54) JOGGING APPARATUS

(75) Inventors: Hauke Luebben, Radolfzell (DE); Jochen Loose, Irving, TX (US); Daniel Kang, Irving, TX (US); Michael Allain, Coppell, TX (US); Michael Yaklin, Coppell, TX (US)

(73) Assignee: Siemens Aktiengesellschaft, Munich (DE)

(*) Notice: Subject to any disclaimer, the term of this patent is extended or adjusted under 35 U.S.C. 154(b) by 269 days.

(21) Appl. No.: 09/954,438

(22) Filed: Sep. 17, 2001

(65) Prior Publication Data

US 2003/0053905 A1 Mar. 20, 2003

(51) Int. Cl.⁷ .............................................. B65G 61/00
(52) U.S. Cl. ........................ 414/798.7; 198/419.3; 198/456
(58) Field of Search ........................... 414/788, 798.7, 414/790.3; 198/419.1, 419.3, 456, 732

(56) References Cited

U.S. PATENT DOCUMENTS

| | | | | |
|---|---|---|---|---|
| 3,845,852 A | * | 11/1974 | Langen et al. ............ | 198/419.3 |
| 4,167,227 A | * | 9/1979 | Pichon et al. .............. | 198/456 |
| 4,333,297 A | * | 6/1982 | Kuttenbaum et al. ...... | 198/456 |
| 5,893,701 A | * | 4/1999 | Pruett ........................ | 73/12.01 |
| 5,947,468 A | * | 9/1999 | McKee et al. .............. | 271/150 |

* cited by examiner

Primary Examiner—Janice L. Krizek
Assistant Examiner—Michael J. Kwon
(74) Attorney, Agent, or Firm—Philip G. Meyers

(57) ABSTRACT

An improved jogger includes a sidewall with a guide groove, a chain defining a closed path including a sloped loading end and a straight transport section, the sloped loading end being angled toward the transport section in the direction of the travel of the chain at least two sprockets, the sprockets defining the slope of the sloped loading end of the closed path, a plurality of fingers coupled to the chain at spaced apart intervals, the fingers receiving flat articles therebetween at the sloped loading end and conveying the articles along the horizontal transport section and a plurality of guides coupled to the fingers, the guides engaging the guide groove and orienting fingers in a position perpendicular to the horizontal transport section as the fingers are carried into the sloped loading end.

20 Claims, 7 Drawing Sheets

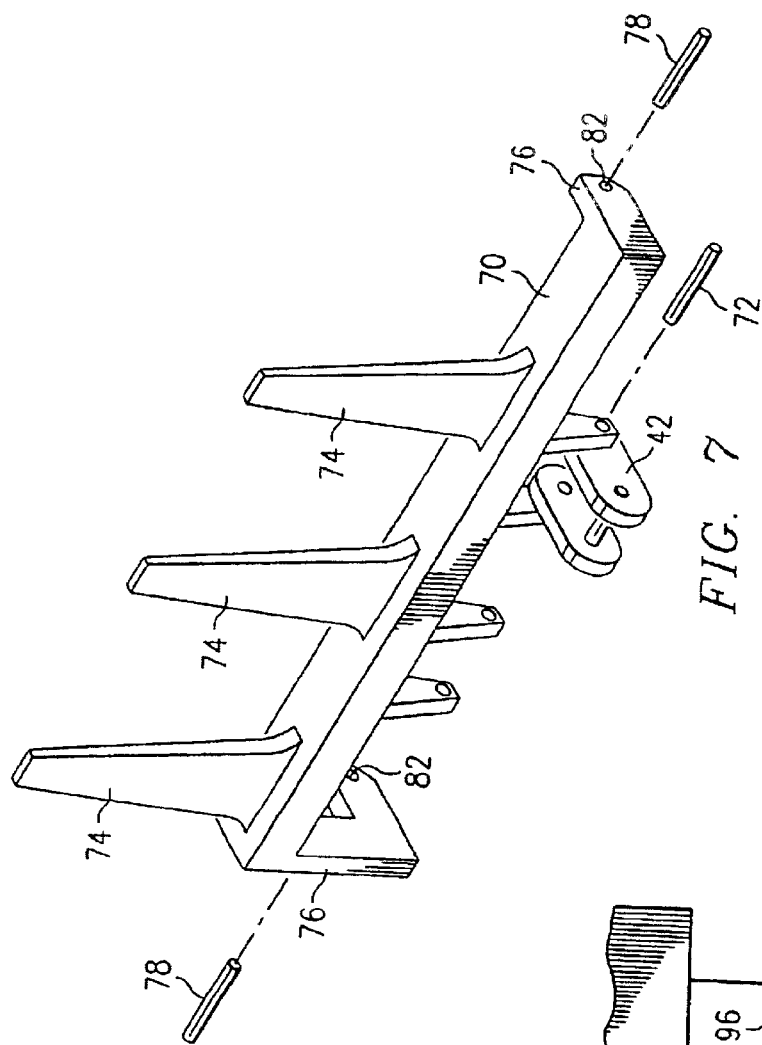
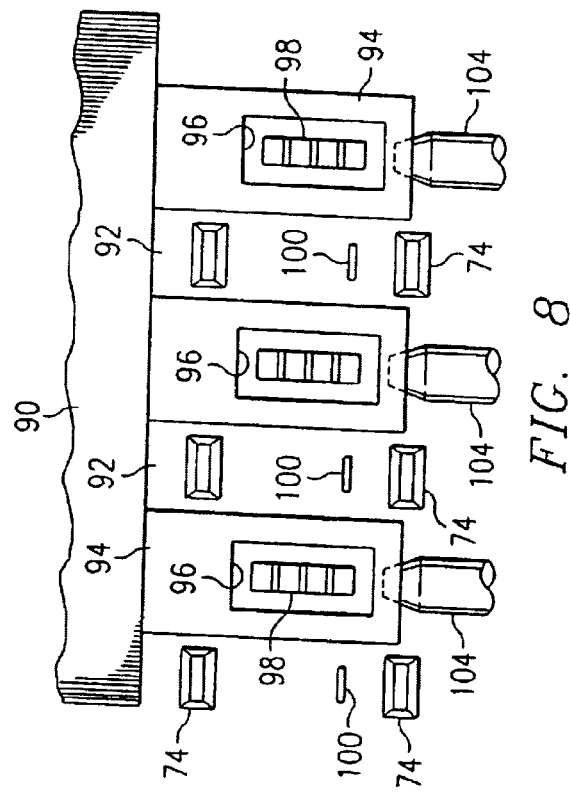

JOGGING APPARATUS

TECHNICAL FIELD

The present invention relates to an apparatus, system and method of feeding flat articles to a sorter, and in particular, to an improved jogger apparatus for use in feeding a mail processing device such as a mail sorter.

BACKGROUND OF THE INVENTION

Modern postal services, for example, the U.S. Postal Service, handle massive volumes of mail pieces on a daily basis. Machines for receiving and sorting these massive volumes of letter mail are known. Typically, such machines are adapted to receive large volumes of flat articles and sort the articles into a plurality of pockets or bins based upon selected criteria. In the case of letter mail, the criteria associated with the destination of the individual mail pieces may be an indicium such as a Zip+4 destination code. Typically, such sorting machines have a feeding station, sensing and detecting equipment for determining the appropriate output compartment or pocket for the article to be sorted and diverting gates or other mechanisms for selectively diverting articles to selected ones of an array of output compartments or pockets for the sorted articles. An example of an advanced sorting machine is the DBSC sorting device, available from Siemens ElectroCom, L.P., Arlington, Tex.

Devices for singulating and feeding mail pieces to a sorting machine are known. One such apparatus is disclosed in U.S. Pat. No. 5,947,468, the disclosure of which is incorporated herein by reference for all purposes. Typically, such devices for singulating and feeding mail pieces include a jogger type conveyor which functions to advance mail pieces to a take off device that removes the mail pieces on a one-by-one basis so as to convert a stack of mail pieces to a singulated stream suitable for further processing. The jogger also severs to impart a jostling or bouncing motion to the stack as it is advanced in order to facilitate edging, or alignment of one set of edges of the mail pieces. The jostling or bouncing motion tends to separate the mail pieces and cause mail pieces pinched between adjacent pieces in an elevated position to move downwardly so as to align the bottom edge of such pieces with the remainder of the stack. Such prior art jogging devices comprise a series of chain driven fingers that travel though an oval path as the chain is driven around a pair of sprockets. The fingers engage a stack of mail, moving the mail as it is subjected to a jostling or bouncing motion. However, the fingers of such prior art joggers sweep through an arc as the chain passes over the sprocket adjacent to the loading end of the jogger. This results in an undesirable compression of mail between the fingers that hinders the jogging process. The improved jogger of the invention alleviates this shortcoming.

SUMMARY OF THE INVENTION

An improved jogger type conveyor includes a flexible carrier defining a closed path including a substantially straight transport segment along which flat articles are conveyed, a sloped loading end where flat articles are loaded on the conveyor and a discharge end where articles are discharged from the conveyor. The closed path defines a first vertical plane passing through the transport segment, sloped loading end and discharge end of the path. A plurality of fingers are coupled to and extended from the flexible carrier for receiving flat articles at the sloped loading end where the fingers move substantially perpendicularly through a second horizontal plane substantially perpendicular to the first plane and parallel to the transport segment. The flat articles are positioned on edge in a gap defined by adjacent fingers as the articles are loaded onto the conveyor. The jogger includes first guide means coupled to the carrier and second stationary guide means that cooperate such that the gap between the fingers does not decrease in size as the flat articles are loaded and conveyed from the loading end to the discharge end of the conveyor. Causing the gap not to increase results in flat articles positioned on edge in the gaps not being subjected to compression resulting from a decrease in the gap between the fingers.

In one aspect, the jogger includes plurality of rotatable guides around which the flexible carrier extends. In this regard, the rotatable carrier guides may be sprockets or pulleys arranged in a trapezoidal pattern. One suitable flexible carrier comprises a chain passing around a plurality of sprockets arranged in a trapezoidal pattern and wherein at least one of the sprockets is a drive sprocket.

In another aspect, the jogger conveyor comprises a return segment and a plurality of brackets coupling the fingers to the flexible conveyor. The brackets include a groove engaging projection for engaging a guide groove adjacent to the path to pivot the bracket as the bracket moves from the return segment to the sloped segment causing the fingers to assume a substantially perpendicular orientation with respect to the second plane. In this aspect, the jogger includes at least one side plate positioned parallel to the vertical first plane with a guide groove formed in the side plate, the groove engaging projection of brackets coupled to the flexible carrier moving through the guide groove and causing a finger coupled to the bracket to pivot to a vertical position as the bracket is carried from the return segment to the sloped segment of the path.

In another aspect, the jogger includes at least one rotating shaft extending parallel to the transport segment of the path, the shaft imparting a bouncing motion to flat articles carried between the fingers as the flat articles are conveyed through the transport segment. The bouncing motion tends to loosen a stack of flat articles compressed together and align the bottom edges of the flat articles for further processing of the stack.

BRIEF DESCRIPTION OF THE DRAWINGS

These and other aspects of the invention will hereafter be described with reference to the accompanying drawings, wherein like numerals denote like elements, and:

FIG. 7 is a perspective view of a finger assembly of the jogger of FIG. 3; and

FIG. 8 is a partial top view of the loading end of the jogger of FIG. 3.

DETAILED DESCRIPTION

While the invention is described below with reference to a preferred embodiment, the description is not intended to be construed in a limiting sense. Various rearrangements of parts, modifications and combinations of the illustrative embodiments, as well as other embodiments of the invention, will be apparent to persons skilled in the art upon reference to the description.

Figure 1:
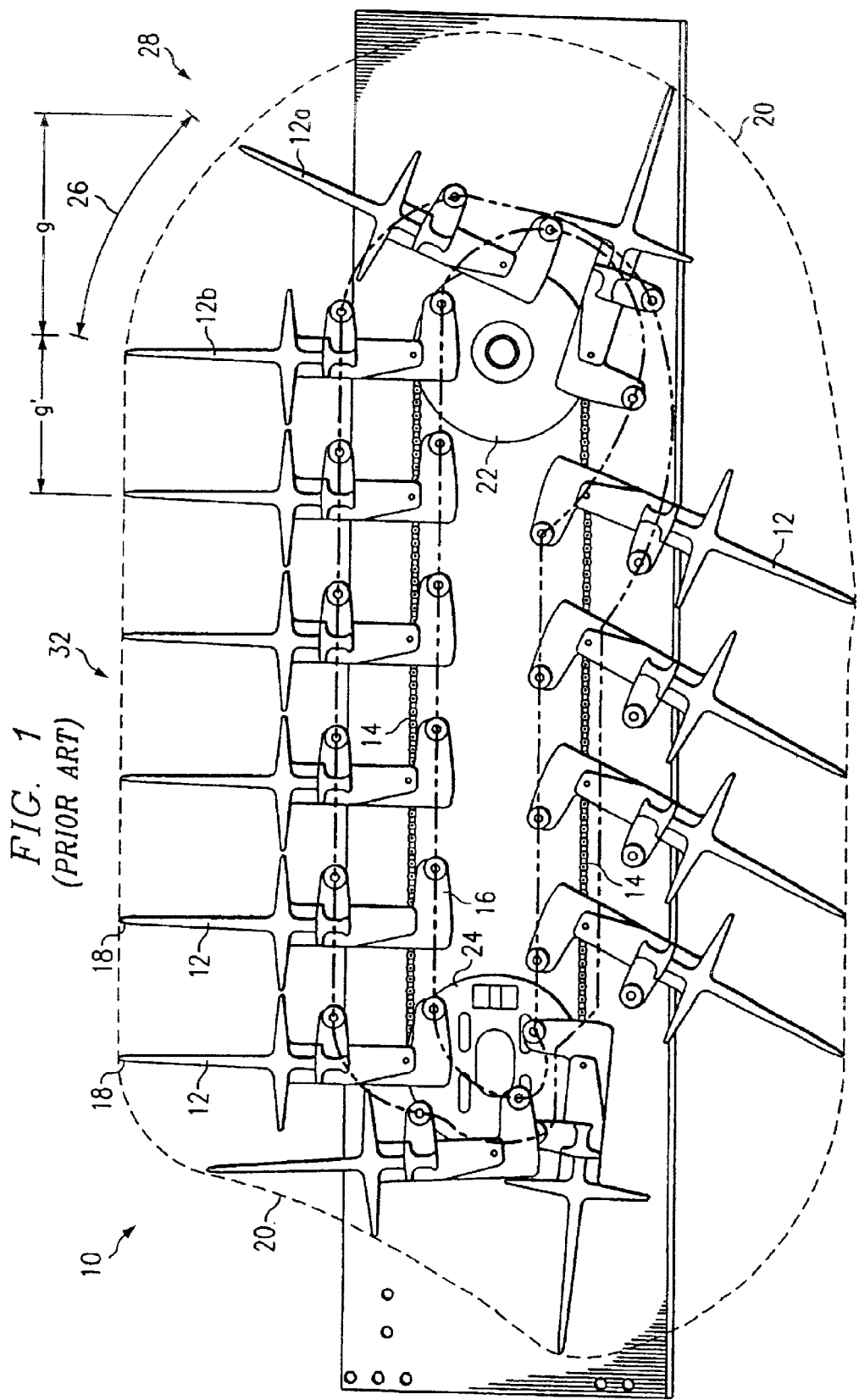
FIG. 1 is a side view of a prior art jogger.

FIG. 1 shows a prior art jogger 10 including a plurality of fingers 12 secured to a drive chain 14 with brackets 16. In operation, chain 14 is driven around sprockets 22 and 24 with a conventional drive, engaging a stack of mail (not shown) at the loading end 28 of the conveyor. As shown, the tips 18 of fingers 12 travel through path 20 as chain 14 passes around sprockets 22 and 24, including an arcuate path segment 26 at the loading end 28 of jogger 10 where mail pieces are loaded between the fingers. As chain 14 advances, the tip 18 of each finger 12 slides up and into the stack of mail as the tip travels through path segment 26. Simultaneously, each finger 12 moves from an angled orientation at the beginning of segment 26 to a substantially vertical orientation at the end of segment 26. Finger 12a is illustrated in the position where it begins to engage a stack of mail at loading end 28 of jogger 10. Finger 12b is illustrated in the vertical position, having traveled through path segment 26.

As illustrated, a gap g exists between the tips 18 of fingers 12a and 12b when the fingers are positioned on either end of segment 26. However, as the fingers pass through and beyond segment 26 into the straight upper portion 32 of path 20, the distance between the tips 18 of the fingers narrows significantly, to a gap g'. As will be appreciated, mail pieces loaded between fingers 12a and 12b in arcuate segment 26 will thus be squeezed or compressed between the fingers as the fingers travel from arcuate segment 26 into the straight upper portion of path 20 where the fingers are vertically oriented. Compression of the mail pieces in this manner hinders the jogging and edging process. Additionally, because fingers 12 are oriented at an angle at the beginning of segment 26 as the fingers slide into the stack of mail pieces being loaded onto jogger 10, the fingers 12 also have a tendency to lift the mail pieces out of the stack. This in turn can cause mail pieces to be caught in an elevated position as the mail pieces are compressed or fall from the machine.

Figure 2:
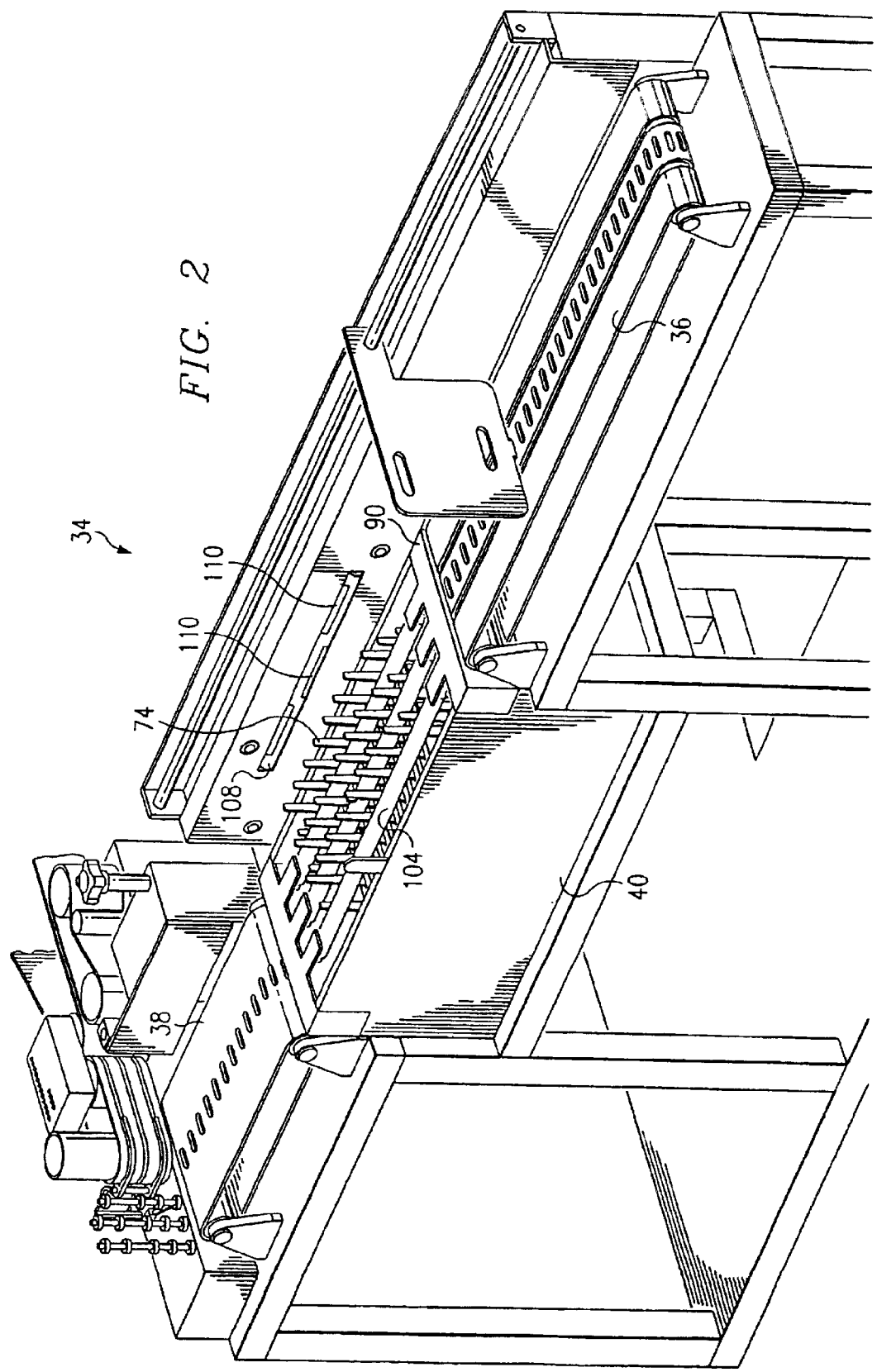
FIG. 2 is a perspective view of a mail feeder including a jogger according to the invention.

Turning now to FIG. 2, a jogger 40 according to the invention is part of a mail feeding apparatus 34 which includes a staging conveyor 36, jogger 40 and a singulating feeder 38. In operation, a stack of mail pieces is loaded on edge onto staging conveyor 36 which conveys the stack onto jogger 40 which in turn transports the stack to singulating feeder 38. As the jogger conveys the stack of mail pieces, it imparts a bouncing or jostling motion to the stack to edge and align the bottom edges of mail pieces in the stack and separate mail pieces that may be stuck together. Jogger 40 transfers the edged stack of mail pieces to the singulating feeder 38 which singulates and feeds the stack on a piece-by-piece basis to a mail sorting machine for further processing.

Referring now to FIGS. 3–8 a jogger 40 according to the invention includes a pair of flexible carriers such as chains 42 (one shown), each passing around and over a plurality of sprockets 44–50 arranged in a trapezoidal pattern. Chains 42 define a continuous closed path 52 as the chains pass around upper sprockets 44, 46 and lower sprockets 48, 50 carrying a plurality of fingers 12 through the path. Path 52 includes a sloped loading end 54 where mail pieces are loaded onto the jogger, a straight transport section 56 where the mail pieces are edged, a sloped unloading end 58 and a return section 60. Path 52 defines a vertical plane A–A' passing through sloped loading end 54, straight transport section 56, sloped unloading end 58 and return section 60. A motor 66 drives least one of sprockets 44–50 directly or with a known conventional chain or belt drive in the direction indicated with arrow 62.

A series of finger brackets 70 are connected to chains 42 with link pins 72 at spaced apart intervals along the chains for carrying one or more fingers 74 that engage a stack 80 of mail pieces 64 positioned on edge as the stack is loaded onto jogger 40 at loading end 54 with a staging conveyor 36. Fingers 74 pass through a horizontal plane B–B' as the fingers are transported through sloped loading section 54. Plane B–B' is perpendicular to plane A–A', and as set forth in detail below, fingers 74 are positioned in a substantially vertical orientation as the fingers pass through plane B–B'. In one embodiment, each holder 70 is integrally formed with a plurality of fingers 74 and brackets 70 spaced at intervals of approximately 3 inches along the length of chains 42. In a preferred embodiment, illustrated in FIG. 7, each bracket 70 is molded from a suitable plastic with three laterally spaced apart fingers 74 extending from the bracket. As shown, each bracket 70 is provided with guide legs 76 for receiving roller guide pins 78 in holes 82. Guide pins 78 engage guide grooves 84 in side plates 86 of jogger 40 and serve to orient brackets 70 and fingers 74 as the holders are carried by chains 42 around path 52.

In operation, stack 80 of mail pieces 64 is pushed or fed from staging conveyor 36 onto the loading or receiving end 54 of jogger 40. In the embodiment shown in FIGS. 2 and 3, in order to allow jogger 40 to engage and smoothly separate stack 80 into increments corresponding to the distance between fingers 74, a slotted bridge plate 90 (FIG. 8) is positioned between staging conveyor 36 and jogger 40. Slotted bridge plate 90 includes a plurality of first slots 92, plate extensions 94 that are separated by slots 92 and a second slot 96 in one or more of extensions 94. As the stack 80 of mail pieces 64 is moved onto jogger 40, fingers 74 move up through slots 92 in bridge plate 90 to engage and separate the stack 80 into increments corresponding to the distance between fingers 74. Timing belts 98 positioned in second slots 96 in one or more of extensions 94 urge the stack 80 across bridge plate 90, facilitating the transfer of the stack onto the jogger.

Figure 3:
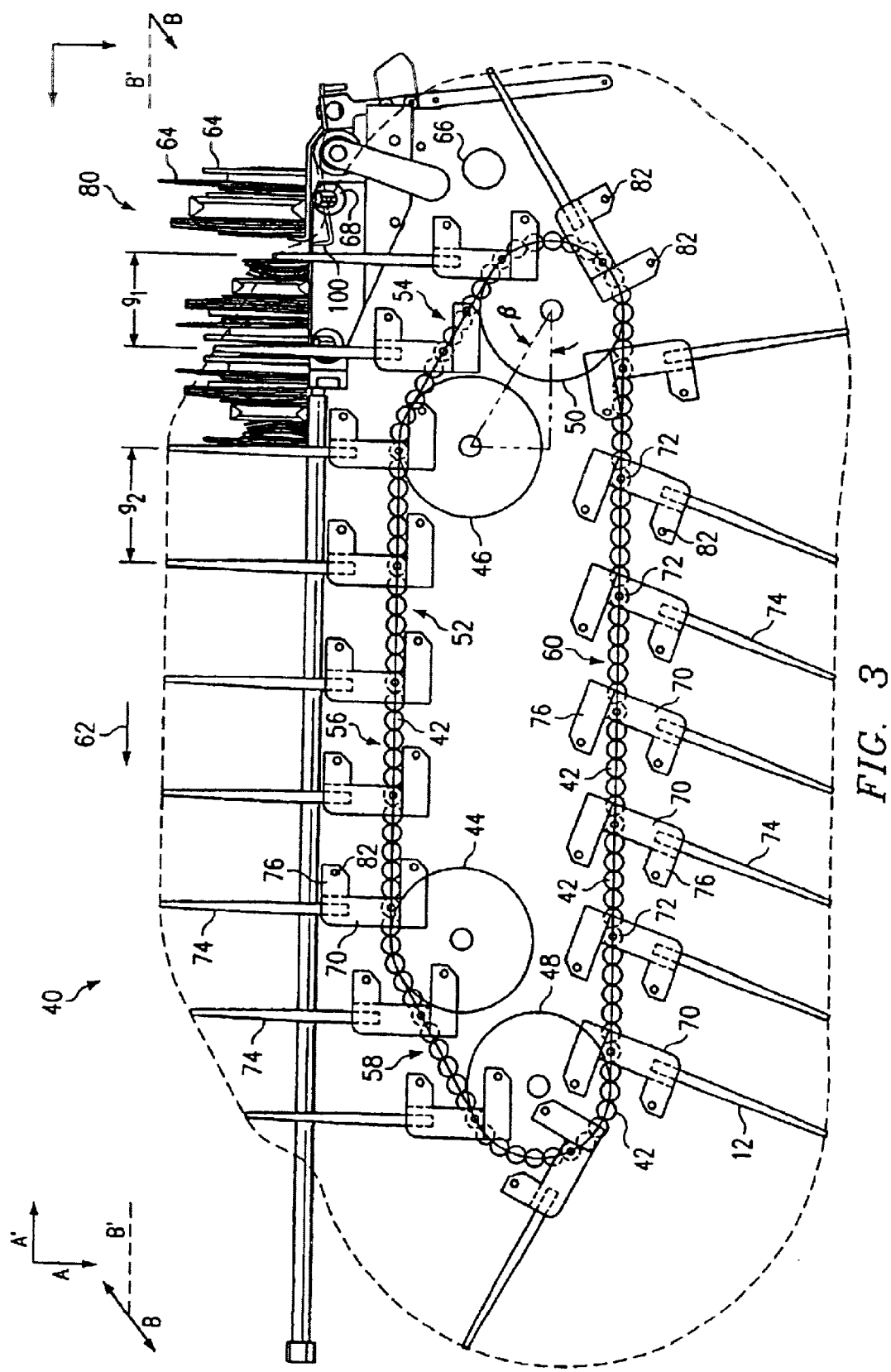
FIG. 3 is partial side view of a jogger in accordance with the invention.
Figure 4:
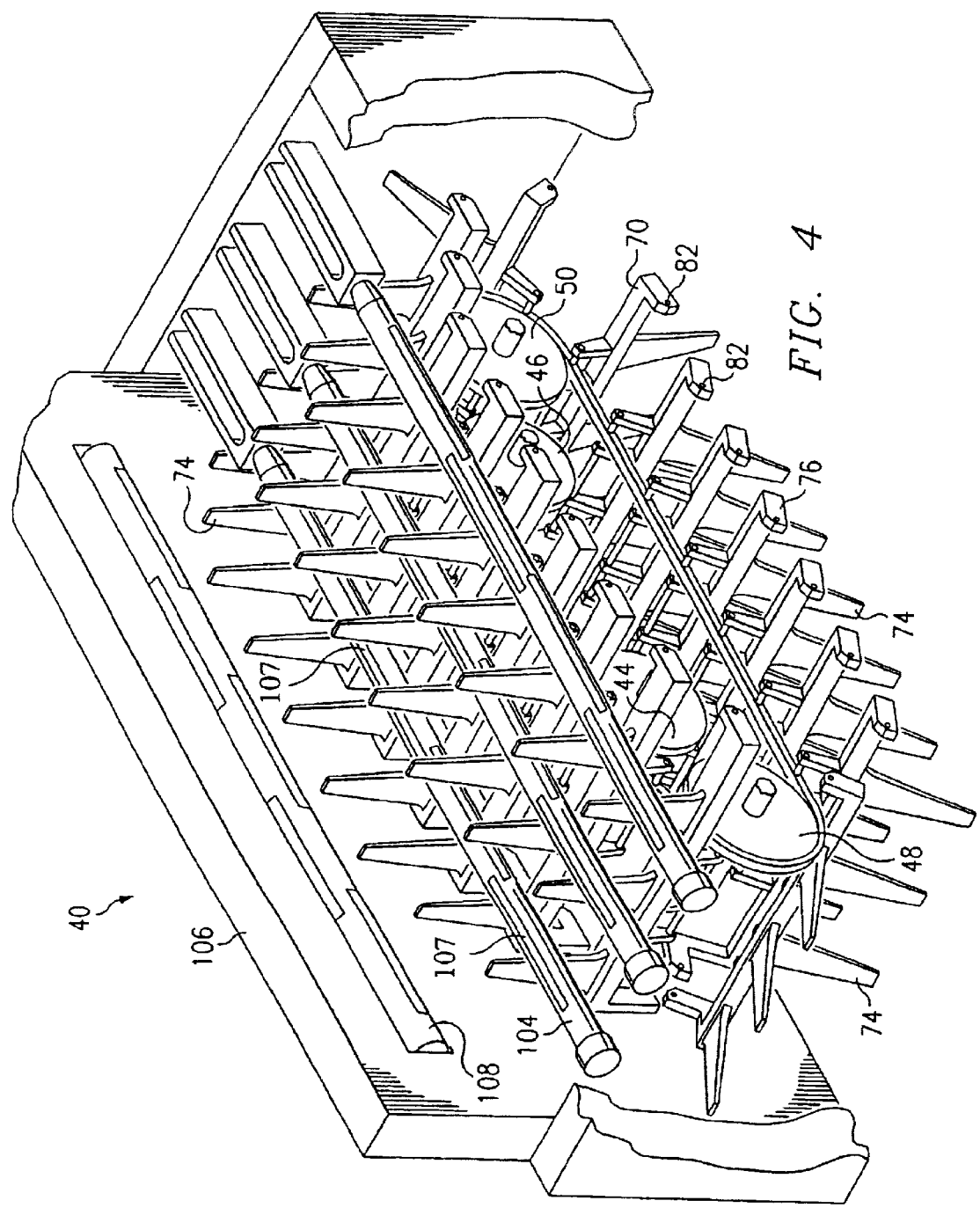
FIG. 4 is a partial perspective of the jogger of FIG. 3.
Figure 5:
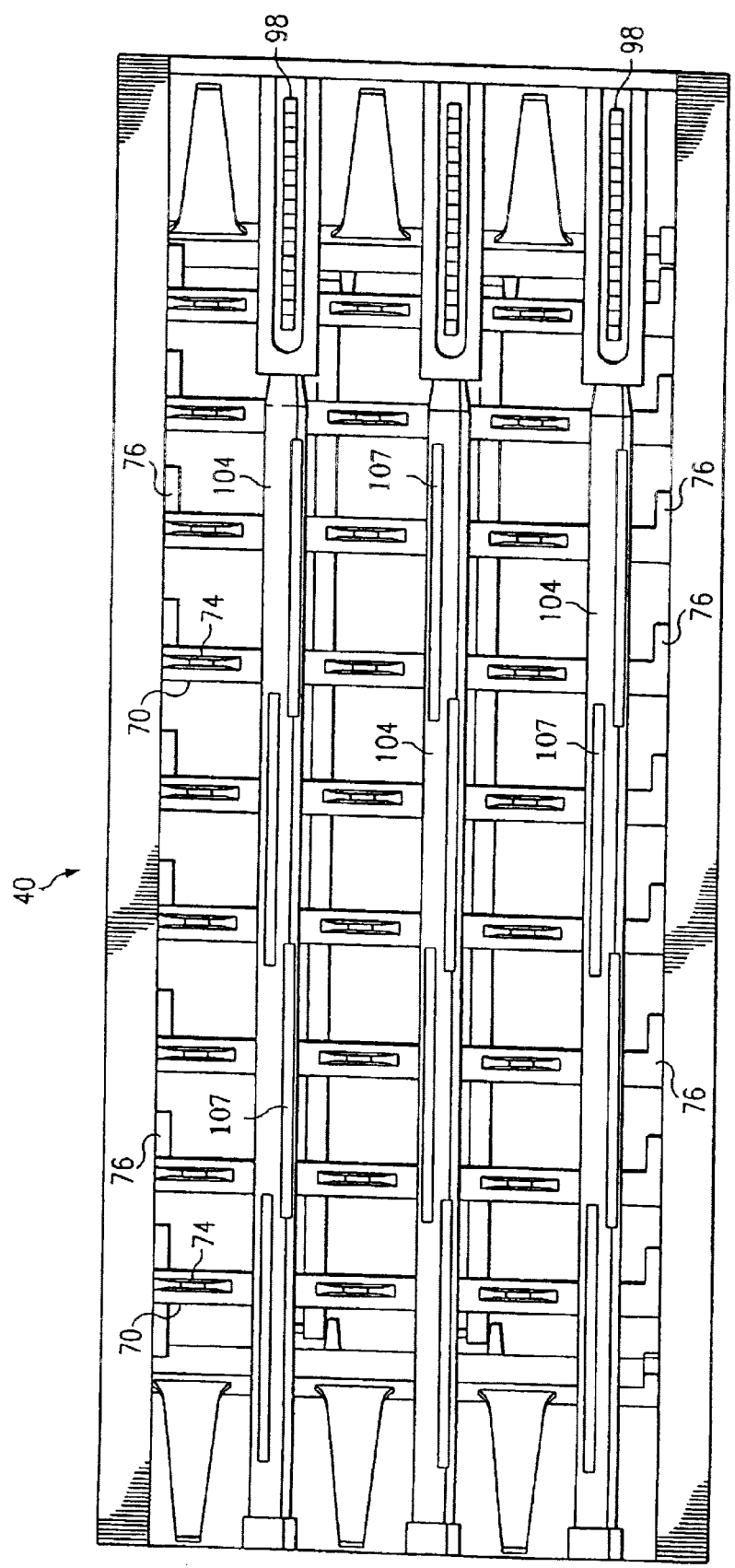
FIG. 5 is a partial top view of the jogger of FIG. 3.
Figure 6:
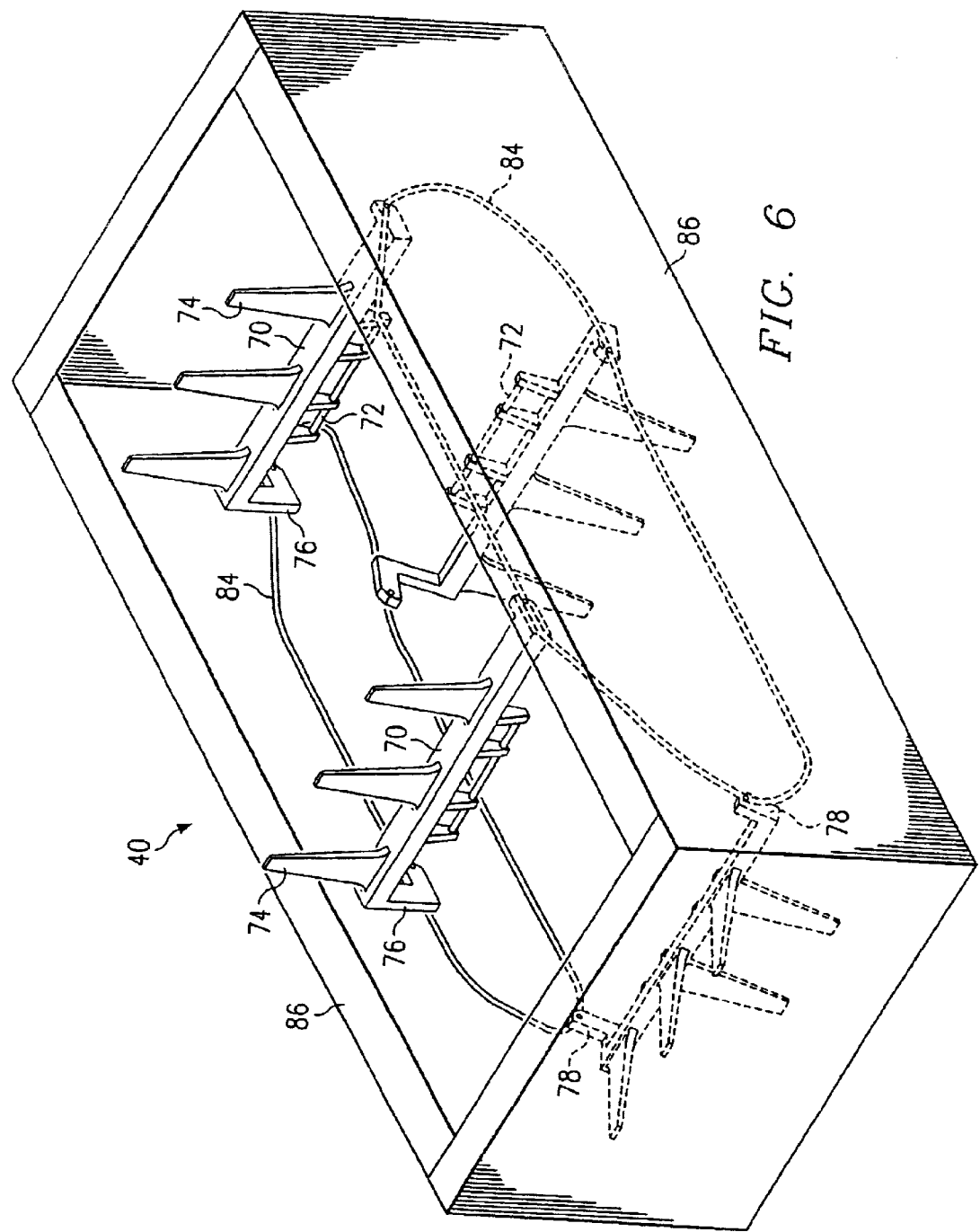
FIG. 6 is partial perspective view of the jogger of FIG. 3 with elements omitted for the purpose of illustration.

In one embodiment, as fingers 74 are advanced, jogger motor 66 simultaneously drives a cam 68 connected to a set of stack separating fingers 100. As best shown in FIG. 3, as motor 66 advances the jogger, cam 68 drives stack separating fingers 100, lifting the fingers 100 up in slots 92 in slotted plate 90 to engage the bottom of mail stack 80. Separating fingers 100 slip between adjacent mail pieces and hold back the bottom edges of mail pieces behind the separating fingers creating a temporary gap. Timing belts 98 aid in the process, pushing the bottom of the stack 80 forward as fingers 100 are lifted by cam 68 to create the temporary separation in stack 80. As jogger 40 advances, a set of fingers 74 rise up into the temporary gap, sliding into stack 80 without lifting mail pieces out of the stack. After fingers 74 have engaged the stack, cam 68 lowers separating fingers 100, releasing the stack and allowing it to continue to advance. While as illustrated and described, separating fingers 100 are driven with cam 68, the fingers could be actuated with a cylinder, solenoid or a similar device controlled by a timer or sensor detecting a finger 74 moving into position to be inserted into the stack.

As best illustrated in FIG. 3, upper sprockets 44 and 46 are positioned in a horizontal plane above lower sprockets 48 and 50 and positioned closer together than lower sprockets 48 and 50. This sprocket arrangement requires chains 42 to travel around lower sprocket 50, reversing direction before traveling up and over sprocket 46. Simultaneously, roller guide pins 78, traveling in guide grooves 84, orient brackets 70 as the brackets are carried by chains 42 around sprocket 50. As will be appreciated by reference to FIGS. 3 and 6 in conjunction, as chains 42 travel around sprocket 50, guide roller pins 78 traveling through guide grooves 84 cause the fingers 74 to move from a downwardly pointing orientation in the return segment 60 of path 52 to an upwardly pointing orientation in the sloped loading end 54 of path 52. Thus, as shown, fingers 74 are oriented vertically before engaging stack 80. Further, because the fingers 74 are oriented vertically as chains 42 transition from the sloped portion to the horizontal transport section 56, the distance $g_1$, between fingers 74a and 74b as the fingers engage the stack, increases to distance $g_2$. The increase in gap size from $g_1$ to $g_2$ allows mail pieces 64 compressed and positioned on edge during loading or during transport with staging conveyor 36 to loosen, facilitating the edging process. As will be appreciated, the increase in spacing between fingers 74 as the fingers travel from the sloped loading end to the horizontal transport section 56 is proportional $\beta$, the upward angle of the sloped loading section 54. (FIG. 3). Thus, the ratio of $g_2$:$g_1$ may be increased or decreased for a particular application by increasing or decreasing $\beta$.

As the mail pieces are conveyed across jogger 40 by fingers 74, a plurality of rotating shafts 104 extending lengthways between fingers 74 and having at least one flattened surface 107 contact the bottom of stack 80. As shafts 104 rotate, the shafts impart a bouncing or jostling motion to mail pieces 64 carried between the fingers to loosen and align the bottom edges of the mail pieces. It will be appreciated that the same bouncing or jostling effect may be imparted with an eccentrically formed or driven shaft. Shafts 104 are driven in clockwise direction as viewed from staging conveyor 36, the rotation tending to edge the mail pieces against back wall 106 of jogger 40. In the illustrated embodiment, an additional rotating shaft 108, also having at least one flattened surface 110, is mounted in wall 106 of jogger 40. Shaft 108 rotates counterclockwise as viewed from staging conveyor 36 to urge mail pieces conveyed by jogger 40 down against shafts 104 as the mail pieces travel along the jogger. In addition to edging the mail pieces, the bouncing action provided by flattened surfaces 107 and 110 of shafts 104 and 108 tends to separate the mail pieces and cause any mail pieces that are held in an elevated position by pressure from abutting mail pieces to move down so that the bottom edge of such mail pieces are aligned with the rest of the stack of mail being carried by jogger 40. Mail pieces 64 edged and loosed as described are transferred for further processing, such as singulation and sorting.

While this invention has been described with reference to illustrative embodiments, this description is not intended to be construed in a limiting sense. Various modifications and combinations of the illustrative embodiments, as well as other embodiments of the invention, all within the spirit and scope of the invention will be apparent to persons skilled in the art upon reference to the description. It is, therefore, intended that the appended claims encompass any such modifications or embodiments.

What is claimed is:

1. A conveyor adapted for conveying a horizontal stack of flat articles disposed edgewise on the conveyor, comprising:

a flexible carrier movable along a closed path and wound about a plurality of parallel, rotating guide members arranged in a trapezoidal pattern, whereby the carrier path includes a substantially straight transport segment along which flat articles are conveyed, an upwardly sloped loading end segment where flat articles are loaded on the conveyor and enter the transport segment, a downwardly sloped discharge end segment receiving articles from the transport segment at which articles are discharged from the conveyor, and a straight return segment;

a plurality of spaced-apart fingers mounted on the carrier at intervals and extending outwardly from the carrier to engage the stack of flat articles;

means for moving the fingers to a substantially upright position as the fingers move through the loading end and transport segments, whereby when the conveyor receives a horizontal stack of flat articles at the loading end segment, the fingers move upwardly in a vertical direction into the stack of flat articles, with gaps between adjacent fingers not decreasing in size as the flat articles are loaded and conveyed from the loading end segment to the discharge end segment of the conveyor, such that flat articles positioned on edge in the gaps are not subjected to compression resulting from a decrease in the gap between the fingers; and at least one separating finger, the separating finger engaging the bottom of the stack, retarding the transfer of the flat articles onto the conveyor as the fingers move upwardly in a vertical direction into the stack of flat articles.

2. The conveyor of claim 1 further comprising:

a slotted horizontal plate for supporting an edgewise stack of flat articles thereon as such articles enter the loading section; and at least one belt conveyor positioned in a slot of the slotted plate and engaging the bottom of the stack to move the stack of flat articles across the slotted plate.

3. The conveyor of claim 1 wherein the means for moving the fingers to a substantially upright position includes a plurality of brackets coupling the fingers to the flexible carrier, the brackets pivoting as the bracket moves along the upwardly sloped loading end segment causing the fingers to assume a substantially upright position.

4. The conveyor of claim 3 further comprising at least one side plate including a guide groove formed in the side plate and wherein each of the brackets comprises a projection, the projection being coupled to the flexible carrier and moving through the guide groove to cause the finger coupled to the bracket to pivot to a substantially upright position as the bracket is carried along the upwardly sloped loading end segment.

5. The conveyor of claim 1 further comprising:

a slotted horizontal plate for supporting an edgewise stack of flat articles thereon as such articles enter the loading section; and a plurality of separating fingers movable through the slotted plate for engaging a leading end of a stack of flat articles being loaded onto the conveyor.

6. The conveyor of claim 5 further comprising a cam for cyclically raising and lowering the separating finger through the slotted plate.

7. The conveyor of claim 5 further comprising at least one rotating shaft extending parallel to the transport segment of the path, the shaft imparting a bouncing motion to flat articles carried between the fingers.

8. The conveyor of claim 7 further comprising a plurality of rotating shafts for imparting a bouncing motion to flat articles carried between the fingers, at least one of the shafts being positioned adjacent a side of the stack.

9. An improved jogger for feeding a horizontal stack of flat articles disposed edgewise comprising:

a sidewall with a guide groove;

a chain defining a closed path including a sloped loading end and a straight transport section, the sloped loading end being angled toward the transport section in the direction of the travel of the chain;

at least two sprockets movably supporting the chain, the sprockets defining the slope of the sloped loading end of the closed path;

a plurality of outwardly extending fingers coupled to the chain at spaced apart intervals, the fingers configured for receiving flat articles therebetween at the sloped loading end and conveying the articles along the straight transport section;

a plurality of guides attached to the fingers, the guides engaging the guide groove and thereby orienting the fingers in a position perpendicular to the straight transport section as the fingers are carried into the sloped loading end by the chain;

a slotted horizontal plate for supporting an edgewise stack of flat articles thereon as such articles enter the loading section; and at least one separating finger movable through the slotted plate for engaging a leading end of a stack of flat articles being loaded onto the jogger.

10. The jogger of claim 9 further comprising means for cyclically raising and lowering the separating finger to form a temporary gap for the insertion of a finger into the stack.

11. The jogger of claim 9 further comprising means for imparting a jogging motion to the articles between adjacent fingers during movement along the transport segment.

12. The jogger of claim 9 wherein each bracket has one of the guides mounted at least one end thereof, the guide engaging the guide groove as the bracket is carried around the closed path by the chain.

13. The jogger of claim 9 further comprising at least one belt conveyor positioned in a slot of the slotted plate and engaging the bottom of the stack to move the stack of flat articles across the slotted plate.

14. The jogger of claim 9, further comprising a plurality of brackets connecting respective fingers to the chain, and pins on the brackets permitting the brackets and fingers to pivot relative to the chain in response to movement of the guides in the guide groove.

15. The jogger of claim 14 wherein a row of two or more of the fingers are integrally formed with each bracket, the fingers in each row being spaced apart in a widthwise direction of the belt, and a plurality of rows of fingers are attached to the chain at regular intervals by the pins.

16. A conveyor adapted for conveying a horizontal stack of flat articles disposed edgewise on the conveyor, comprising:

a flexible carrier movable along a closed path and wound about a plurality of parallel, rotating guide members arranged in a trapezoidal pattern, whereby the carrier path includes a substantially straight transport segment along which flat articles are conveyed, an upwardly sloped loading end segment where flat articles are loaded on the conveyor and enter the transport segment, a downwardly sloped discharge end segment receiving articles from the transport segment at which articles are discharged from the conveyor, and a straight return segment;

means for imparting a bouncing motion to the stack of flat articles as the articles are conveyed through the transport segment; and a plurality of spaced-apart fingers mounted on the carrier at intervals and extending outwardly from the carrier to engage the stack of flat articles, the fingers moving upward in a substantially vertical direction through the stack of flat articles at spaced apart intervals such that flat articles conveyed between the fingers are not compressed in the loading segment and transport segment.

17. The conveyor of claim 16 further comprising means for separating the stack of flat articles to enable the fingers to move upwardly into the stack of flat articles without displacing articles from the stack.

18. The conveyor of claim 16 further comprising means for moving the fingers to a substantially upright position as the fingers move through the loading end and transport segments, whereby gaps between adjacent fingers do not decrease in size as the flat articles are loaded and conveyed from the loading end segment to the discharge end segment of the conveyor.

19. The conveyor of claim 16 further comprising a plurality of rotating shafts for imparting a bouncing motion to flat articles carried between the fingers, at least a first one of the shafts being positioned adjacent a side of the stack and at least a second one of said being positioned below the stack.

20. The conveyor of claim 16 further comprising means for conveying the stack of flat articles across the slotted plate.

* * * * *